United States Patent
Gillia et al.

(10) Patent No.: US 9,045,334 B2
(45) Date of Patent: Jun. 2, 2015

(54) METHOD FOR MANUFACTURING A HYDROGEN TANK WITH METAL HYDRIDES

(75) Inventors: Olivier Gillia, Sassenage (FR); Maxime Botzung, Grenoble (FR); Michel Latroche, Saint Cyr l'Ecole (FR)

(73) Assignees: Commissariat a l'Energie Atomique et aux Energies Alternatives, Paris (FR); Centre National de la Recherche Scientifique, Paris (FR)

( * ) Notice: Subject to any disclaimer, the term of this patent is extended or adjusted under 35 U.S.C. 154(b) by 865 days.

(21) Appl. No.: 12/992,570

(22) PCT Filed: May 12, 2009

(86) PCT No.: PCT/EP2009/055728
§ 371 (c)(1),
(2), (4) Date: Mar. 3, 2011

(87) PCT Pub. No.: WO2009/138406
PCT Pub. Date: Nov. 19, 2009

(65) Prior Publication Data
US 2011/0138748 A1   Jun. 16, 2011

(30) Foreign Application Priority Data
May 15, 2008   (FR) ...................... 08 53151

(51) Int. Cl.
*F17C 11/00*   (2006.01)
*C01B 3/00*   (2006.01)

(52) U.S. Cl.
CPC ............. *C01B 3/0084* (2013.01); *C01B 3/0005* (2013.01); *C01B 3/0026* (2013.01);
(Continued)

(58) Field of Classification Search
CPC ............................ F17C 11/005; Y02E 60/327
USPC ........... 53/400, 428, 111 R, 111 RC; 206/0.7; 423/658.2
See application file for complete search history.

(56) References Cited

U.S. PATENT DOCUMENTS 4,133,426 A * 1/1979 Turillon et al. ................. 206/0.7
4,389,239 A * 6/1983 Klatt et al. ..................... 206/0.7
(Continued)

FOREIGN PATENT DOCUMENTS

EP   0188996   7/1986
EP   1286406   2/2003
(Continued)

OTHER PUBLICATIONS

Anton, et al., "High density hydrogen storage system demonstration using $NaAlH_4$ complex compound hydrides", United Technologies Research Center, DOE Merit review, Arlington VA, May 23-26, 2005, 24 pages.
(Continued)

*Primary Examiner* — Stephen F Gerrity
(74) *Attorney, Agent, or Firm* — Knobbe Martens Olson & Bear LLP

(57) ABSTRACT

Systems and methods for manufacturing a tank for storing hydrogen in metal hydride powder are disclosed. The tank can include a closed enclosure divided into closed cells. Each of the cells can contain metal hydride powder. Each of the cells can also be manufactured successively by assembling the cells in order to form an open cavity or alveolar cell. One or more bulk pieces of a material capable of forming a metal hydride can be placed in the cavity. The cell can be closed with the bulk pieces by closing the cavity. After cells are closed, hydrogen can be introduced into the tank for transforming the bulk pieces into metal hydride powder.

15 Claims, 1 Drawing Sheet

(52) U.S. Cl.
CPC ............. *C01B3/0036* (2013.01); *C01B 3/0042* (2013.01); *C01B 3/0047* (2013.01); *C01B 3/0068* (2013.01); *F17C 11/005* (2013.01); *Y02E 60/321* (2013.01); *Y02E 60/327* (2013.01)

(56) References Cited

U.S. PATENT DOCUMENTS

| | | | |
|---|---|---|---|
| 4,667,815 A | 5/1987 | Halene | |
| 4,819,717 A * | 4/1989 | Ishikawa et al. | 206/0.7 |
| 6,015,041 A | 1/2000 | Heung | |
| 6,290,085 B1 | 9/2001 | Tochigi | |
| 6,708,546 B2 * | 3/2004 | Myasnikov et al. | 206/0.7 |
| 7,320,726 B2 * | 1/2008 | Shih et al. | 206/0.7 |
| 7,431,756 B2 * | 10/2008 | Myasnikov et al. | 206/0.7 |
| 2002/0056715 A1 | 5/2002 | Fujita et al. | |
| 2005/0051294 A1 * | 3/2005 | Fujita et al. | 165/10 |
| 2007/0178335 A1 * | 8/2007 | Zimmermann | 429/12 |

FOREIGN PATENT DOCUMENTS

| | | | | |
|---|---|---|---|---|
| EP | 1454875 A2 * | 9/2004 | | C01B 3/00 |
| FR | 2894598 | 6/2007 | | |
| JP | 58-2201 A * | 1/1983 | | F17C 11/00 |
| JP | S58-2201 | 1/1983 | | |
| JP | S61-172000 | 8/1986 | | |
| JP | H06-108186 | 4/1994 | | |
| JP | H06-299272 | 10/1994 | | |
| JP | H09-199155 | 7/1997 | | |
| JP | H09-209063 | 8/1997 | | |
| JP | H09-236199 | 9/1997 | | |
| JP | H09-316571 | 12/1997 | | |
| JP | H10-245653 | 9/1998 | | |
| JP | 2001-257322 | 9/2001 | | |
| JP | 2002-30360 | 1/2002 | | |
| JP | 2002-71098 | 3/2002 | | |
| JP | 2002-146446 | 5/2002 | | |
| JP | 2002-156097 | 5/2002 | | |
| JP | 2004-83966 | 3/2004 | | |
| JP | 2004-526659 | 9/2004 | | |
| JP | 2005-009549 | 1/2005 | | |
| JP | 2007-270209 | 10/2007 | | |
| JP | 2008-13375 | 1/2008 | | |

OTHER PUBLICATIONS

French Search Report from related French application No. FR 0853151, dated Feb. 24, 2009, 1 page.

International Preliminary Report on Patentability from PCT/EP2009/055728, dated Feb. 7, 2011, 8 pages.

International Search Report from PCT/EP2009/055728, dated Jan. 10, 2009, 3 pages.

Heung, et al. "On-board hydrogen storage for a city transit bus", Westinghouse Savannah River Company, 1998, 10 pages.

Mori, et al., "High-pressure Metal Hydride tank for Fuel Cell Vehicles", IPHE International Hydrogen Storage Technology Conference Jun. 1-22, 2005, Lucca, Italy, 18 pages.

Mosher, et al., "High density hydrogen storage system demonstration using $NaAlH_4$ complex compound hydrides", United Technologies Research center, East Hartford, Connecticut, Project ID STP 33, DOE Hydrogen program, Annual peer review, Arlington VA, May 16, 2007, 22 pages.

Sandrock, "A panoramic overview of hydrogen storage alloys from a gas reaction point of view", Journal of Alloys and Compounds, 293-295, 1999, pp. 877-888, 12 pages.

United Nuclear Scientific Supplies, LLC, "United Nuclear—Hydrogen Fuel Systems", http://www.switch2hydrogen.com/, copyright 1998-2010, 2 pages.

International Search Report and Written Opinion dated Oct. 1, 2009 for PCT Application No. PCT/EP2009/055728, 14 pages.

Japanese Office Action for Japanese Application No. 2011-508898 dated Jun. 4, 2013, 14 pages.

\* cited by examiner

METHOD FOR MANUFACTURING A HYDROGEN TANK WITH METAL HYDRIDES

TECHNICAL FIELD

The invention relates to a method for manufacturing a tank for storing hydrogen, with metal hydrides.

More specifically, the invention relates to a method for manufacturing a storage tank for storing hydrogen in a metal hydride powder.

The technical field of the invention may generally be defined as that for storing hydrogen, in particular for storing hydrogen using metals or alloys with which hydrogen may be stored as solid hydrides of these metals or alloys.

Because of the increase in the price of oil and the reduction of its reserves, it increasingly seems that hydrogen may be an interesting replacement fuel.

Indeed, hydrogen is available quasi-unlimitedly: it may be produced from coal, from natural gas and from other hydrocarbons, but also without resorting to fossil fuels, for example by electrolysis of water by using renewable energies or nuclear energy.

Hydrogen is also a low cost fuel, the economical benefit of which will increase with the rise of the oil barrel price.

Hydrogen further has the highest energy density per unit weight among all chemical fuels, and is practically non-polluting since the main product of its combustion is water.

However one of the major drawbacks of hydrogen, in particular during its application for the propulsion of vehicles, is its difficulty to be stored.

Traditionally, hydrogen has been stored in tanks under very high pressures, or else as a liquid at a very low temperature, which requires a significant supply of energy for pressurization or liquefaction.

High pressure or low temperature storage poses significant problems as regards safety since hydrogen is extremely flammable, and any leak should therefore be avoided.

Moreover, it is known that certain metals and alloys allow reversible storage and release of hydrogen, in the form of solid hydrides of these metals or alloys.

The storage of hydrogen in the form of solid hydrides has great efficiency because of the higher volume storage density which it provides when it is compared with the storage in the form of compressed gas in pressurized tanks or in the form of a liquid.

The storage of hydrogen in the form of solid hydrides also causes less problems of safety than the storage of hydrogen in the form of a liquid or a gas in tanks.

The solid metal or alloy may store large amounts of hydrogen by absorbing hydrogen with high volume density, and by forming a hydride under specific conditions of temperature and pressure, and the hydrogen may be released by changing these conditions.

Presently, tanks, containers, for storing hydrogen applying metal hydrides are all of an identical design from the point of view of the placement of the hydrogen-storing material in the container and of the heat exchanger being part of this tank, container.

This hydrogen-storing material appears as a powder and is inserted into the container which is designed so that it may withstand the hydrogen pressure required for its operation.

For the most performing tanks, the powder is placed in metal structures with more or less complex geometries in order to facilitate heat exchanges inherent to the endothermicity or exothermicity of the hydration reaction.

Indeed, if a metal powder M is considered, there is formation of a metal hydride when hydrogen $H_2$ penetrates into the metal matrix in order to form the hydride $MH_x$.

The formation of the metal hydride generates a release of heat which has to be removed if the intention is to obtain fast loading of hydrogen, since a rise in temperature inhibits absorption of hydrogen.

A tank for storing hydrogen on hydride therefore includes a portion intended for handling heat exchanges, which comprises a heat exchanger either with forced convection or not.

How this heat exchanger is designed and positioned is very important with regard to the expected absorption or desorption kinetics during the storage of hydrogen in the metal or the alloy, and during the release from storage (withdrawal) of the hydrogen from the metal or alloy hydride.

As shown in the following diagram 1: during the storage, an exothermic reaction occurs and heat is released, and during release from storage (withdrawal) an endothermic reaction occurs and heat has to be supplied to the metal or alloy hydride.

Storage: Heat is released (exothermic)

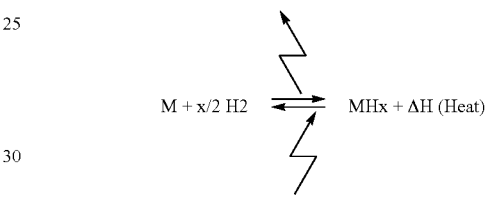

$$M + x/2\, H_2 \rightleftharpoons MH_x + \Delta H\ (\text{Heat})$$

Release from storage (withdrawal): Heat has to be provided (endothermic)

Diagram 1

During the building of such tanks, the structure of the exchanger is first assembled inside the pressurized tank, and then the storage material, i.e. the metal or the alloy, is introduced as a powder into the structure of the exchanger, which generally includes multiple cells, through one or more filling orifices. Filling is accomplished by granular, gravity flowing. The flow of the powder may be assisted by setting the system into vibration.

This technique is difficult to control because of the flow problems of the powder.

Further, the filling levels, i.e. the amounts of materials in each cell to be filled, are quite random and quasi-impossible to control.

Further, the powder during the handling operations which it undergoes, has a very strong risk of being contaminated, oxidized by the surrounding atmosphere.

Document [1] describes a tank comprising an aluminium fins/tube heat exchanger inserted into a container which withstands the gas pressure. The hydride powder is surely poured in between the fins by means of gravity. The man skilled in the art of granular materials knows that this distribution will not be perfectly uniform.

Document [2] relates to a hydrogen storage tank comprising a double-walled enclosure provided with heating coils for controlling desorption, and with an insulation, which comprises a cooling tube supplied with ammonia and provided with fins in order to control hydrogen absorption.

The tank is filled with an unspecified metal hydride powder.

The method for manufacturing this tank is not described in detail but it is certainly as described above.

Documents [3] and [4] relate to hydride tanks comprising an exchanger, a system for admitting the water and hydrogen fluids, and a casing withstanding the operating pressure.

The interior of the tank is divided into compartments, each of them contains a matrix in a material such as an aluminium foam, forming cells in which particles of milled, ground, metal hydride are placed.

The method, for manufacturing this tank is complex, long and costly.

Document [5] describes a bi-axial vibration system for causing a hydride powder to flow into a tank with a heat exchanger. The method using this system is long and very difficult to control. The filling with the hydride powder is irregular and is not uniform over the whole of the tank.

Another manufacturing technique exists. It consists of manufacturing tablets by compacting the powder and assembling them on the tubes of a heat exchanger. It is also possible to simultaneously compact (<<co-compact>>) the powder such as an alanate powder with aluminium foam cylinders.

Thus, document [6] describes a tank in which hydride $NaAlH_4$ powder is simultaneously compacted (<<co-compacted>>) with aluminium foam. The tablet is crossed by a cooling and hydrogen admission system.

There again, the method for manufacturing the tank is complex, long and costly.

It emerges from the foregoing that there exists a need for a method for manufacturing a hydrogen storage tank using a metal hydride powder which is, simple, reliable, controllable, reproducible, easy to use, operate, which includes a limited number of steps and which is not of a high cost.

There notably exists a need for such a method which allows the metal hydride to be regularly distributed in the tank, and the filling level to be controlled in order to obtain specific, accurate, filling levels, perfectly defined and not at random.

Further, there exists a need for such a method for manufacturing a hydrogen storage tank with which it is possible to obtain a tank having high thermal efficiency, i.e. including a complex heat exchanger into which the hydride is inserted.

There is also a need for a method for manufacturing a hydrogen storage tank with metal hydride powder in which the purity of the powder is preserved during the method.

There moreover exist difficulties for activating the hydrides and making hydride powders by "decrepitation".

Decrepitation is known to the man skilled in the art as the process through which hydrogen by inserting itself into a dense piece of hydride material reduces the latter into powder by bursting of this piece into a multitude of small pieces forming a powder. Depending on the size of the piece to be reduced into powder, this is only accomplished over several hydridation/dehydridation cycles.

After a certain number of cycles—a quite reduced number from the moment when the hydridation reaction was able to be initiated, for example from 5 to 10 cycles for centimetric pieces for example—the size of these powder grains stabilizes.

It is sometimes very difficult to initiate this activation because of the presence of a contaminated layer at the surface of the powder pieces or grains.

Complex methods are used for activating the powders, like the one described in the document of Latroche [7].

In the method discussed in this document, the material is subject to several thermal cycles at various heating and cooling rates, some of them under hydrogen, and within temperature intervals which are located outside those used during a standard use of the hydride.

The goal of the present invention i.e. is to provide a method for manufacturing a storage tank for storing hydrogen in a metal hydride powder which notably meets the needs listed above.

The goal of the present invention is further to provide a method for manufacturing a storage tank for storing hydrogen in a metal hydride powder which does not have the drawbacks, defects, limitations and disadvantages of the methods of the prior art, and which solves the problems of the prior art.

This goal and other further goals are, according to the invention, achieved by a method for manufacturing a storage tank for storing hydrogen in a metal hydride powder, comprising a closed enclosure (chamber) divided into closed elementary (basic, unit) cells defined by walls, each of the cells containing metal hydride powder, characterized in that each of the cells is successively manufactured by performing the following steps a), b) and c):

a) Certain (some), but not all the walls defining the cell are assembled in order to thereby form an open cavity or alveolar cell; and then b) one or more massive (solid) piece(s) of a material capable of forming a metal hydride, are placed in said cavity or alveolar cell, the volume of the massive piece(s) being such that it(they) leave(s) a free space in the cell; and then c) the last walls defining the cell are assembled for closing said cell;

d) steps a), b), c) are repeated for the number of times required for manufacturing all the cells of the enclosure; each cell being provided with one or more orifice(s) made in its walls in order to cause hydrogen to enter or exit the cell; and then e) the enclosure is closed;

f) hydrogen is introduced into the enclosure, whereby the massive piece(s) of material in each of the cells is(are) transformed into the metal hydride powder;

g) step f) is optionally repeated;

steps b), c), d) and e) being carried out under a protective atmosphere, in a closed enclosure such as a glove box for example.

By protective atmosphere is generally meant a non-oxidizing, non-humid atmosphere, for example an atmosphere of an inert gas such as argon, nitrogen or mixtures thereof.

The method according to the invention fundamentally differs from the methods for manufacturing a hydrogen storage tank with metal hydrides of the prior art in that one or more massive (solid) pieces, for example a piece of material capable of forming a metal hydride, which is then transformed by hydrogenation into hydride powder, and not directly a metal hydride powder, are placed in each of the elementary individual cells of the enclosure of the tank.

By using massive (solid) pieces according to the invention, such as metal or metal alloy ingots and not a metal or metal alloy hydride powder, the manufacturing, mounting of the tank are greatly facilitated, its duration is shortened and its cost is also reduced.

Indeed, massive pieces are much easier to handle than a powder and further no loss of material occurs and no pollution of the vicinity of the method.

The method according to the invention is simple, reliable, controllable and reproducible.

The filling level, i.e. the amount of material in each cell to be filled, is perfectly under control, and the same applies to the overall filling level of the tank.

The filling of the tank is perfectly uniform, homogeneous, totally checked, controlled and by no means at random as in the methods of the prior art.

Further, the obtained final tank, because of its manufacturing method, is easily adaptable for obtaining greater thermal efficiency and is much easier to use.

Another major advantage of the method according to the invention is that this method avoids handling operations of a hydride powder which is very sensitive to oxidation, and/or contamination of the surface of the grains with water.

In addition to the fact that the proposed method avoids delicate powder handling operations, it also has the advantage that it is very easy to clean the surface of a massive piece (in order to allow initiation of hydridation) while this is impossible to do that on each of the grains of a powder.

Indeed a powder always has a much larger specific surface area than a solid of the same mass, and is therefore extremely more sensitive to surface contamination of the grains. A contaminated powder sees its storage potential and its absorption kinetics strongly reduced or even cancelled out. A massive material such as an ingot has a much smaller specific surface area, it is therefore much less sensitive to the action of the atmosphere during handling operations and is much easier to clean.

Further, the material placed in the cells is a metal or metal alloy which is much less sensitive to oxidation than a hydride which furthermore is in the form of a powder.

Therefore both the (massive and non-powdery) form of the material used in the method and its nature (metal or metal alloy and not a metal hydride) are advantageous in the method according to the invention.

It may be stated that the method according to the invention makes the most out of one of the properties of the materials making up the metal hydrides, for facilitating the assembly, the manufacturing and the use of the tanks for storing hydrogen in metal hydrides.

Indeed, metal hydride powders may be obtained by decrepitation of a massive metal or metal alloy (they may also be obtained by crushing of the massive material, but this case does not interest us here).

Decrepitation as this has already been indicated above, is the phenomenon according to which, in a few hydrogenation cycles, the metal material, either a metal or an alloy, in the form of an ingot will be broken up into small grains, under the effect of the intrinsic swelling of the material due to the insertion of hydrogen atoms into the crystalline lattice of the metal or of the metal alloy; a metal or metal alloy hydride powder results from this, the grain size of which is generally equilibrated around a few micrometers.

Generally, it may be considered that the method according to the invention consists of introducing massive parts called massive pieces, directly into the cells of the hydrogen tank rather than powder.

The walls of these cells generally form a heat exchanger in order to convey heat to the material or to remove heat therefrom.

The massive pieces are introduced into cavities having the space required for the change in volume inherent to the transformation into powder, the goal being that once the material is transformed into powder, it is preferably in contact with all the walls of each cell which has the effect of optimizing the thermal efficiency, but that the walls are not deformed, modified, pushed back.

The massive piece(s) of the material capable of forming a metal hydride may have the shape of a polyhedron.

The massive piece(s) of the material capable of forming a metal hydride preferably have the shape of a parallelepiped, still preferably a rectangular parallelepiped, with dimensions compatible with the cells.

The massive piece(s) of a material capable of forming a metal hydride may be cut out from a block, a massive ingot of larger size, for example with a size of 50×50×100 mm, to dimensions adapted to each cavity, preferably in a protective, controlled atmosphere as defined above, i.e. non-oxidizing and non-humid.

Herein, a block of material such as a raw cast metal is generally designated by <<ingot>>.

A block of material, such as a metal which is cut out, cut in an ingot, is generally designated by <<piece>>.

This piece, as this was mentioned above, generally has a polyhedral, preferably parallelepipedal shape.

According to a particularly advantageous feature of the method according to the invention, the massive piece(s) of the material capable of forming a metal hydride is(are) subject to mechanical machining, working, in a protective atmosphere before it(they) is(are) placed in the cavity or alveolar cell (i.e. prior to step b)).

This mechanical machining may be grinding, severing (cutting), cutting-out, scraping, stripping (blasting), filing, turning, milling, sanding or a combination thereof.

Surprisingly, this mechanical machining such as simple scraping or stripping (blasting), allows activation and decrepitation of a piece of material capable of forming a metal hydride, in an extremely simple way, without it being necessary to resort to complex activation operations such as those described in the aforementioned document [7].

It is extremely surprising that one manages to activate the material with view to its decrepitation by simple mechanical machining, for example by simple scraping or stripping (blasting) of the surface of the material.

This activation although much simpler than the known complex activation method for example with thermal cycling, gives excellent results.

The material capable of forming a metal hydride may be selected from all the materials having hydridation properties, provided that they are initially obtained in the non-hydride state in the form of solid blocks. In this respect, reference may be made to document [8].

The material capable of forming a metal hydride may notably be selected from intermetallic compounds AB5, AB2, A2B, AB3, A2B7, A2B17, such as TiFe, LaNi5, Mm- Ni, Ti—Cr, CaNi5, Ti—Cr, Ti—Mn, Zr—Mn, Ti—Mn—V, Zr—Fe—Cr, Ti—Zr—V, Ti—Fe—Mn, Ti—Fe—Ni; from materials in the form of a solid solution with a BCC structure for example in vanadium such as V—Ti—Fe, or V—Ti—Cr; from pure metals such as Mg, Be, Ti, Zr, V, La, U, Y; metal alloys like magnesium alloys such as Mg—Ni, Mg—Cu; and mixtures of two materials, or of more than two materials, from the materials listed in the foregoing.

It should however be noted that for pure metals, their conditions of use at high temperature and equilibrium pressure are not the best suitable for the operation of a tank.

The selection of the free space to be left in each cell will depend on the intrinsic swelling of the powder which, itself, depends on the material.

The selection of the free space also depends on the desired powder density (mass divided by volume) in each cell, i.e. in each cavity of the exchanger. This density is perfectly controllable by means of the method according to the invention. The density will condition the heat conductivity and how the powder will push on the walls of the cells, cavities during the swelling which accompanies hydridation, but without deforming the walls. These effects depend on the nature of the hydride powder. The empty space should therefore be adapted depending on the constitutive material of the hydride powder.

The empty space is generally selected so that decrepitation does not cause any deformation of the walls of each cell and that the expansion of the hydride is contained by the walls of the cells without the walls being deformed, pushed back. In other words, each cell retains its shape and its initial volume at the end of the decrepitation.

The empty space in each cell generally accounts for at least 20% of the volume of the cell, preferably from 20 to 50%, still preferably from 20 to 30%. The massive piece(s) occupy(ies) the remaining volume of the cell, for example from 70 to 80%.

At the end of <<decrepitation>>, the metal hydride powder is preferably in contact with all the walls of the elementary cell which contains it, but advantageously without the walls having been deformed or pushed back and therefore without any modification of the initial volume of the elementary cell or of its shape.

The whole of the walls of the cells preferably forms a heat exchanger and, each cell therefore defines a cavity of the exchanger. In other words, the walls of the cells are for example the fins of a heat exchanger inserted into the closed enclosure.

The method may also comprise a step for mounting conduits for introducing and discharging the hydrogen, and a step for mounting conduits for conveying a heat transfer fluid.

Other advantages of the method according to the invention will become apparent upon reading the detailed description which follows, made as an illustration and not as a limitation in connection with the appended drawings wherein.

The method according to the invention is a method for manufacturing a tank for storing hydrogen in a metal hydride powder, comprising a closed enclosure (chamber) divided into closed elementary cells (1) defined by walls (2, 3, 4, 5), each of the cells (1) containing metal hydride powder.

Figure 1:
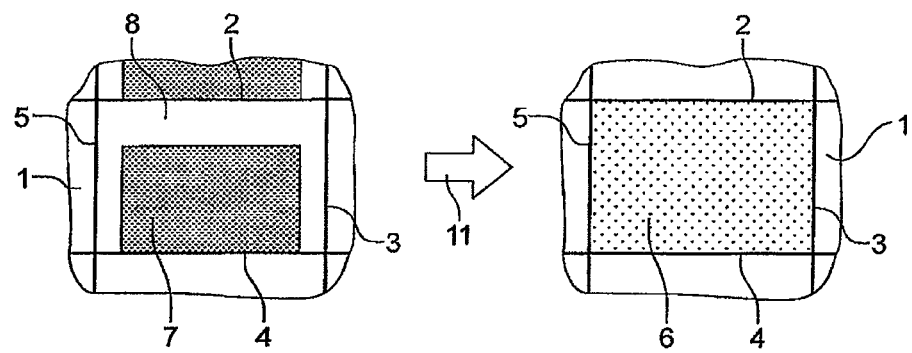
FIG. 1 is a schematic illustration of the method according to the invention or more specifically of the steps f) and g) thereof.
Figure 2:
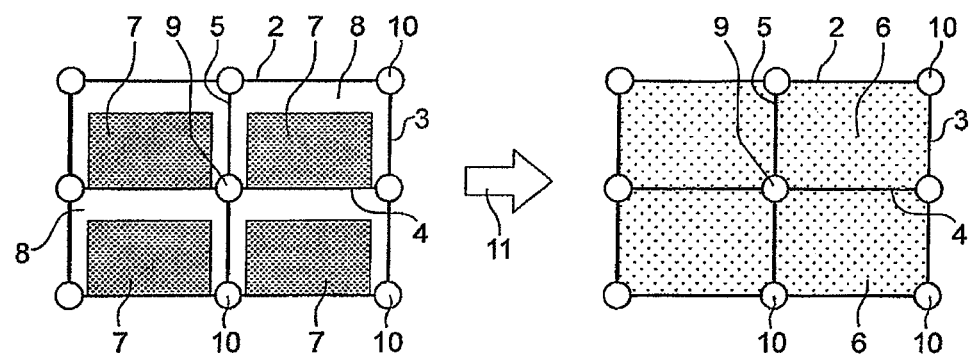
FIG. 2 is also a schematic illustration of the method according to the invention, or more exactly of the steps f) and g) thereof, in which are indicated the systems for introducing hydrogen and the heat transfer fluid in charge of regulating the thermics of the tank.

Thus, one of these cells appears in FIG. 1, while 4 of these cells are illustrated in FIG. 2.

The whole of the walls defining the elementary cells forms a heat exchanger intended to bring heat to the material found inside the cells and/or to remove heat from this material.

The walls (2, 3, 4, 5) may be hollow, and a heat transfer fluid may flow through them and/or these walls may be the fins of a heat exchanger placed in the closed enclosure.

In the following, in order to simplify, the assembly formed by all the elementary cells and the walls defining these cells will therefore be designated as <<exchanger>>.

This exchanger is itself placed in a closed enclosure forming the tank.

The method according to the invention may for example take place as described below.

The exchanger is built by assembling generally metal parts.

The metal or alloy making up the exchanger and therefore the walls of the elementary cells thereof preferably has good heat conductivity properties.

This metal or alloy may be selected from aluminium and its alloys, and from stainless steel (316L for example) which is not as good a conductor but sometimes more physico-chemically compatible with the hydride materials of the tank.

The elementary cells (1) may have any shape, for example the elementary cells may have the shape of polyhedra, for example parallelepipeds, preferably rectangular parallelepipeds.

It is advantageous that the cells (1) have a shape similar to the material pieces, blocks which they receive in order to facilitate assembly.

Also, the size of said cells (1) may be variable, in the case when these cells have the shape of rectangular parallelepipeds, the latter may have a size of 25×25×50 mm, or a smaller size like 20×20×40 mm, or even 10×10×20 mm, or even still smaller such as 2×2×4 mm.

The cells (1) may indeed be more or less large depending on the desired compromise between thermal efficiency and the mass of the tank system.

All the cells (1) may have the same shape and optionally the same size or else the cells (1) may differ by their shape and/or their size.

This is specifically one of the advantages of the method according to the invention which allows the manufacturing of heat exchangers with complex geometries, notably more complex than the geometry of the exchangers manufactured by the methods of the prior art. The exchangers prepared by the method according to the invention thus have geometries which are more adapted to optimization of the heat exchanges, which allows an improvement in the thermal efficiency of the tank.

The manufacturing of tanks containing exchangers with complex geometries is possible according to the method of the invention by the fact that the constraint of filling with powder is avoided since the hydrogen-absorbing material is provided in the form of blocks, pieces (7) which may easily be placed in each of the cells even during the manufacturing. The material is therefore easily distributed in the whole of the tank.

During mounting, the assembling of the exchanger shows cavities or alveolar cells.

By cavity, alveolar cell, is meant a non-closed elementary cell, in other words a cell, one or more of the walls (2, 3, 4, 5) of which defining it having not yet been assembled.

In each alveolar cell, cavity (1), one or more pieces, blocks (7) of a material capable of forming a metal hydride are introduced, as illustrated in FIG. 1 on the left and in FIG. 2 on the left.

In FIG. 1 and FIG. 2, a single piece, block, is illustrated in each alveolar cell, but it is quite obvious that several pieces may be introduced into each alveolar cell.

The material capable of forming a metal hydride may be selected from all the materials having hydridation properties, provided that they are initially obtained in the non-hydride state in the form of solid blocks. In this respect reference may be made to document [8]. This material may be selected from intermetallic compounds AB5, AB2, A2B, AB3, A2B7, A2B17, such as TiFe, LaNi5, Mm-Ni, Ti—Cr, CaNi5, Ti—Cr, Ti—Mn, Zr—Mn, Ti—Mn—V, Zr—Fe—Cr, Ti—Zr—V, Ti—Fe—Mn, Ti—Fe—Ni; from materials in solid solution with a BCC structure, for example in vanadium, such as V—Ti—Fe, or V—Ti—Cr; pure metals such as Mg, Be, Ti, Zr, V, La, U, Y; metal alloys like magnesium alloys such as Mg—Ni, Mg—Cu; and mixtures of two materials, or of more than two materials, from the materials listed in the foregoing.

In the foregoing, Mm designates <<Mischmetal>>.

The term of <<Mischmetal>> is a term well-known to the man skilled in the art in this technical field. <<Mischmetal>> is an alloy which consists in a raw mixture of cerium, lanthanum, neodymium and other rare earth metals in approximate proportions in which they are naturally present in the ore.

It is recalled that different hydrogen storage materials provide different absorption capacities of hydrogen depending on the pressures and temperatures used.

The material capable of forming a metal hydride according to the invention appears in the form of massive (solid) pieces, blocks (7).

By massive (solid) piece, block (7), is meant that the material appears in the form of individual discrete pieces, the size of which is very much larger than that of the grains of a powder.

As an example, the ingots, blocks from which are obtained the pieces, blocks introduced into the alveolar cells, generally have a size defined by their largest dimension from a few millimeters to a few meters depending on the crucible in which they are obtained, and the massive pieces, blocks (7) obtained by cutting out these ingots generally have a size defined by their largest dimension of the order of one mm to a few mm, more particularly between 1 and 10 mm, while a powder of this same material includes grains with a size generally from 0.5 to 10 µm.

By massive (solid) is meant that the pieces, blocks (7) of the material are compact and are notably not formed by the agglomeration of several particles, for example by compacting a powder as this is sometimes the case in the prior art.

The pieces of the material capable of forming a metal hydride may appear in any form, shape, but they generally appear in the form of polyhedra, more specifically in the form of parallelepipeds, as this is illustrated in FIGS. 1 and 2, preferably in the form of rectangular parallelepipeds, for example with a size of 10×10×20 mm or further 2×2×5 mm which are therefore generally designated as pieces.

The material may be received in the form of large size ingots (for example 50×50×100 mm, or even 100×100×200 mm) generally obtained by casting, from which each piece is cut out to the dimensions adapted to each cavity.

The massive nature of the pieces, blocks is thus reflected by the fact that they are obtained from blocks, pieces, ingots, of larger size and not by assembling, compacting granules, particles, for example by compacting a powder, or further by agglomeration of pieces.

The cutting-out of the pieces, blocks, is preferably accomplished in an enclosure with a non-oxidizing controlled protective atmosphere and protecting the surface of the sample.

This cutting-out may be accomplished by any conventional standard means for machining, for example severing (cutting), turning, milling, grinding, . . . .

It is preferable that the non-machined faces, i.e. the surfaces of the raw cast ingots, be for example slightly scraped, or stripped (blasted) with abrasive devices, during a grinding, sanding operation with abrasive paper for example, in order to expose non-corroded material at the surface.

Indeed, it is important according to the invention that the polyhedral pieces be rid of their oxide layer—preventing the onset of hydridation—by mechanical machining.

This mechanical machining should be accomplished under a protective atmosphere preferably in the same closed enclosure, such as a glove box, as the mounting of the tank.

Mechanical machining will preferably be accomplished by grinding, because of the often very hard nature of the hydride materials or by severing (cutting), cutting of, for example with an abrasive disk (with diamond for example), or by scraping or stripping (blasting) with abrasive paper or simply with a file.

It should be noted that these mechanical machining operations for example grinding, severing (cutting), cutting of, may entirely or partly coincide with cutting operations for example grinding, severing (cutting), milling, turning allowing the pieces to be prepared, cut from the ingots.

This activation of the material by means of mechanical machining is an advantageous preferred feature of the method of the invention. Indeed, many other "hydride activation" methods are complex and cumbersome to apply (see document of LATROCHE [7]). It is surprising to be able to activate a massive hydride piece (and to cause its decrepitation) for example only by scraping it or stripping it under a protective atmosphere.

Next, the pieces have necessarily to be kept under an inert protective atmosphere, until the tank is closed, which will also be accomplished under a protective atmosphere.

The empty free space (8) to be left in each alveolar cell, and then in each cell, depends on the relative density of the desired hydride material in each alveolar cell.

The empty free space (8) in each alveolar cell generally accounts for at least 20% of the volume of the cell, preferably from 20 to 50%, still preferably from 20 to 30% of the volume of the cell.

As an example, if a porosity from 20 to 30% is desirably obtained, a free space (8) of 20-30% of the volume of the alveolar cell should be left in each alveolar cell, the volume of the piece(s) of cut hydride precursor material therefore being from 70 to 80% of the volume of the alveolar cell.

The heat exchanger is thus entirely built in layers.

During the gradual assembly of the heat exchanger, the alveolar cells in which one or more pieces of material capable of forming a hydride have been introduced, are closed by the walls of the next alveolar cells in order to thereby form closed cells, and so forth up to the furthest surfaces of the geometry of the exchanger.

The result of this is a heat exchanger consisting of cells (1) filled with one or more pieces of material capable of forming a hydride, these cells not including any powder-filling orifices. Generally, only a few small holes, orifices (not shown) have generally to be provided in the walls (2, 3, 4, 5) of the cells (1), in order to allow hydrogen to enter or exit each cell.

Holes of a few microns are sufficient, at the same time they will prevent the powder from escaping.

A tube for example made with an agglomerated and semi-sintered powder of stainless steel particles is for example perfectly suitable for making the hydrogen feed, this method is known to the man skilled in the art.

The size of these <<small>> holes is thus disproportionate with the size of the orifices which should exist for letting through powder into a tank manufactured by a conventional method.

By <<small>> holes, is generally meant that the holes have a size defined by their diameter, in the case of circular holes, from 1 to 1,000 µm to be compared with the size of the filling orifices which would for example be from 1 to 5 mm.

The tank containing the thereby assembled exchanger is then hermetically sealed.

In FIG. 2, the preparation of a tank by the method according to the invention or more specifically by the steps d) to g) of this method is illustrated schematically; this tank including a system for feeding hydrogen and the heat transfer fluid in charge of adjusting the thermics of the tank.

The hydrogen feeding system comprises a porous tube (9), while the system for feeding the heat transfer fluid includes non-porous tubes (10).

The mounting of such an exchanger which will be included in the tank, i.e. in a container which withstands the hydrogen pressure, is also accomplished per stage, the fluid feeding tubes being set into place beforehand and the stages of the exchanger plates being slipped onto these tubes.

A few hydridation cycles, for example from 5 to 10 cycles, are then required for finishing, completing, the manufacturing and conditioning of the hydrogen tank (arrow 11).

The hydridation cycles consist of introducing hydrogen into the tank preferably under temperature and pressure conditions adapted to the selected hydride material.

For $LaNi_5$, the introduction of hydrogen at room temperature at a pressure of a few bars may for example be suitable.

For a TiVFe hydride, the pressure will certainly have to be increased a little more, around a hundred bars, still at room temperature.

The material will naturally be reduced into powder in each cavity, the man skilled in the art calls this "decrepitation", and after a few cycles, for example from 5 to 10 cycles, the tank will reach its optimum and stabilized operation; and the hydride powder (6) will then occupy the whole of the volume of each cell (1) and will be in contact with all the walls (2, 3, 4, 5) of each cell (1), but without the walls being deformed, pushed back and without the volume of the cell after decrepitation being modified relatively to the initial volume of the cell.

The possible applications of the method for manufacturing a hydrogen storage tank according to the invention relate to the whole of the field of application of hydrogen storage.

The method according to the invention may therefore be used for manufacturing tanks intended for transportation means such as boats, submarines, cars, buses, trucks, building machines, two-wheeled vehicles, as well as in the field of transportable energy supplies such as batteries for portable electronic devices, (portable telephones, portable computers).

Stationary systems for storing energy in a large amount are also potential applications, these are notably electricity-generating units, devices for storing hydrogen produced in a large amount by wind turbines, photovoltaic panels, geothermy, . . . .

REFERENCES

[1] Daigoro Mori, Norihiko Haraikawa, <<High-pressure Metal Hydride Tank for Fuel Cell Vehicles>>, IPHE International Hydrogen Storage Technology Conference 19-22 Jun. 2005, Lucca, Italy.
[2] http://www.switch2hydrogen.com/[3]
[3] L. K. Heung, "On-board Hydrogen Storage for a city Transit Bus", Westinghouse Savannah River Company, 1998.
[4] U.S. Pat. No. 6,015,041
[5] D. Mosher, X. Tang, S. Arsenault, B. Laube, M. Cao, R. Brown and S. Saitta, "High Density Hydrogen Storage System Demonstration Using $NaAlH_4$ Complex Compound Hydrides", United Technologies Research Center, East Hartford, Conn., Project ID STP 33, DOE Hydrogen program, Annual peer review, Arlington Va., May 16$^{th}$, 2007.
[6] High Density Hydrogen Storage System Demonstration Using $NaAlH_4$ Complex Compound Hydrides D. L. Anton D. A. Mosher, UTRC, DOE Merit Review; Arlington, 2005.
[7] FR-A-2 894 598
[8] G. Sandrock, <<A panoramic overview of hydrogen storage alloys from a gas reaction point of view", Journal of Alloys and Compounds 293-295 (1999) 877-888.

The invention claimed is:

1. A method for manufacturing a storage tank for storing hydrogen in a metal hydride powder, comprising a closed enclosure divided into closed elementary cells defined by walls, each of the cells containing metal hydride powder, the method comprising:
   a) assembling at least one of the walls defining a cell in order to thereby form an open cavity or alveolar cell;
   b) placing at least one solid piece of a material capable of forming a metal hydride in the open cavity or alveolar cell, the volume of the at least one solid piece being such that the volume leaves a free space in the cell that accounts for at least 20% of the volume of the cell; and
   c) assembling the last walls defining the cell in order to close the cell;
   d) repeating steps a), b), c) for the number of times required for manufacturing all cells of the enclosure, each cell being provided with at least one orifice made in its walls in order to have hydrogen enter or exit the cell;
   e) closing the enclosure; and
   f) introducing hydrogen into the enclosure, whereby the at least one solid piece of material in each of the cells is transformed into the metal hydride powder,
   wherein step f) is optionally repeated, and
   wherein steps b), c), d), and e) are carried out under a protective atmosphere in a closed enclosure.

2. The method according to claim 1, wherein the at least one solid piece of the material is configured to form a metal hydride having the shape of a polyhedron.

3. The method according to claim 2, wherein the at least one solid piece of the material is configured to form a metal hydride having the shape of a parallelepiped or a rectangular parallelepiped.

4. The method according to claim 1, further comprising cutting at least one solid piece of the material configured to form a metal hydride from a block, the block comprising a solid ingot of a larger size to dimensions adapted to each cavity, and wherein the cutting is performed under a protective atmosphere.

5. The method according to claim 1, wherein the at least one solid piece is subject to mechanical machining under a protective atmosphere, prior to step b).

6. The method according to claim 5, wherein said mechanical machining is one of grinding, severing, cutting, scrapping, stripping, filing, turning, milling, and sanding or a combination thereof.

7. The method according to claim 1, wherein the material configured to form the metal hydride is selected from the group consisting of intermetallic compounds, materials in solid solution with a BCC structure, pure metals, metal alloys, and any combination thereof.

8. The method according claim 7, wherein the intermetallic compounds are selected from the group consisting of AB5, AB2, A2B, AB3, A2B7, A2B17 type compounds, and TiFe, LaNi5, Mm-Ni, Ti—Cr, CaNi5, Ti—Cr, Ti—Mn, Zr—Mn, Ti—Mn—V, Zr—Fe—Cr, Ti—Zr—V, Ti—Fe—Mn, and Ti—Fe—Ni compounds.

9. The method according claim 7, wherein the materials in solid solution with a BCC structure are selected from the group consisting of V—Ti—Fe, and V—Ti—Cr; the pure metals are selected from the group consisting of Mg, Be, Ti, Zr, V, La, U, Y; and the metal alloys are selected from the group consisting of magnesium alloys Mg—Ni, and Mg—Cu.

10. The method according to claim 1, wherein the metal hydride powder is in contact with all walls of an elementary cell which contains the metal hydride powder.

11. The method according to claim 1, wherein the whole of the walls of the cells forms a heat exchanger.

12. The method according to claim 1, further comprising mounting feed and discharge conduits for hydrogen; and mounting conduits for conveying a heat transfer fluid.

13. The method according to claim 1, wherein a free space of each cell accounts for 20% to 50% of the volume of the cell.

14. The method according to claim 1, wherein a free space of each cell accounts for 20% to 30% of the volume of the cell.

15. A method for manufacturing a storage tank for storing hydrogen in a metal hydride powder, comprising a closed enclosure divided into closed elementary cells defined by walls, each of the cells containing metal hydride powder, the method comprising:
   a) assembling at least one of the walls defining a cell in order to thereby form an open cavity or alveolar cell;
   b) placing at least one non-powder solid piece of a material capable of forming a metal hydride in the open cavity or alveolar cell, the volume of the at least one non powder solid piece being such that the volume leaves a free space in the cell that accounts for at least 20% of the volume of the cell; and
   c) assembling the last walls defining the cell in order to close the cell;
   d) repeating steps a), b), c) for the number of times required for manufacturing all cells of the enclosure, each cell being provided with at least one orifice made in its walls in order to have hydrogen enter or exit the cell;
   e) closing the enclosure; and
   f) introducing hydrogen into the enclosure, whereby the at least one non-powder solid piece of material in each of the cells is transformed into the metal hydride powder, wherein step f) is optionally repeated, and
   wherein steps b), c), d), and e) are carried out under a protective atmosphere in a closed enclosure.

* * * * *